United States Patent [19]

Herrera-Garcia et al.

[11] Patent Number: 5,218,617
[45] Date of Patent: Jun. 8, 1993

[54] APPARATUS FOR FEEDING IRON-BEARING MATERIALS TO METALLURGICAL FURNACES

[75] Inventors: Marco A. Herrera-Garcia, Monterrey; Rodolfo A. de la Garza Villarreal, San Nicolás de los Garza, both of Mexico

[73] Assignee: Hylsa S.A. de C.V., San Nicolas de los Garza, Mexico

[21] Appl. No.: 531,780

[22] Filed: Jun. 1, 1990

[51] Int. Cl.$^5$ .............................................. F27D 7/06
[52] U.S. Cl. ............................. 75/10.66; 373/33; 373/34; 373/72; 373/81; 373/79; 266/160; 266/200; 75/571
[58] Field of Search .................. 373/79, 71-78, 373/80, 81, 33, 34, 111, 115, 63; 75/10.66, 10.38, 10.39, 10.48, 10.51, 375, 548, 573, 581, 65 R, 68 R, 72; 266/88, 160, 200

[56] References Cited

U.S. PATENT DOCUMENTS

| | | | |
|---|---|---|---|
| 586,687 | 7/1897 | Heath | 373/79 |
| 937,074 | 10/1909 | Johnson | 373/79 |
| 971,782 | 10/1910 | Petersson | 373/80 |
| 1,153,786 | 9/1915 | Highfield | 373/79 |
| 1,196,202 | 8/1916 | Berglund | 373/115 |
| 1,338,881 | 5/1920 | Stock | 373/79 |
| 1,421,185 | 6/1922 | Driscoll | 373/81 |
| 1,422,135 | 7/1922 | Rogatz | 373/79 |
| 1,871,848 | 8/1932 | Gustafsson | 75/10.38 |
| 1,902,638 | 3/1933 | Gustafsson | 75/10.59 |
| 2,430,171 | 11/1947 | Hatch | 373/79 |
| 2,657,990 | 11/1953 | Kuzell | 423/48 |
| 2,805,930 | 9/1957 | Udy | 75/10.34 |
| 3,462,538 | 8/1969 | Pellegrini et al. | 373/79 |
| 3,472,650 | 10/1969 | Sibakin et al. | 75/10.61 |
| 3,681,049 | 8/1972 | Celada | 373/71 |
| 4,225,745 | 9/1980 | Harwell | 373/79 |
| 4,872,907 | 10/1989 | Areaux | 75/375 |

FOREIGN PATENT DOCUMENTS 847454 7/1970 Canada .

Primary Examiner—Bruce A. Reynolds
Assistant Examiner—Tu Hoang
Attorney, Agent, or Firm—A. Thomas S. Safford

[57] ABSTRACT

A method and apparatus for feeding iron-bearing particles into a metallurgical furnace such as an electric arc furnace, comprising a vessel for containing a bath of molten iron, having a wall extending above the bath of molten iron, a preferably screw type feeder mounted on the exterior of the vessel, a feeding port in the vessel wall shaped to permit passage of the feeder into the interior of the bath of vessel and located at such a height from the molten iron so that no molten materials will spill out from the furnace through the port during the normal operation and maneuvering of the furnace; and actuating means for extending the screw type feeder from a retracted position out of the vessel to an extended position into the vessel. Iron-bearing particles are charged at a point proximate to the bath of molten iron, and at the same time are positively pushed into the slag layer in the direction of the molten iron and also of the hottest zone of the furnace whereby the overall productivity of the furnace is increased.

8 Claims, 2 Drawing Sheets

APPARATUS FOR FEEDING IRON-BEARING MATERIALS TO METALLURGICAL FURNACES

FIELD OF THE INVENTION

The invention relates to the art of feeding iron-bearing materials to metallurgical furnaces for steelmaking, and more particularly to a method and apparatus for introducing iron-bearing particles, such as prereduced iron ore lumps, prereduced iron ore pellets, Direct Reduced Iron (DRI) also called sponge iron, scrap and the like into electric steelmaking furnaces.

BACKGROUND OF THE INVENTION

The harsh and extreme operating conditions of the steelmaking furnaces, i.e. the high temperatures and the inherent problems of handling molten metals as well as the huge production rates, make it difficult, to devise efficient methods and equipment for charging the furnaces, not only with the metallic iron charges in solid or liquid form, but also with diverse additives necessary to refine the molten iron to obtain the desired composition and the characteristics of steel.

Although the invention will be herein described as applied to feeding DRI to Electric Arc Furnaces (EAF), it will be understood that the invention can be easily modified and adapted to other types of furnaces and materials.

Many methods of feeding EAF's have been proposed and tried over the years. In the early days of electric arc steel-making, such furnaces were charged essentially with scrap by means of huge buckets. The furnace was opened by swinging aside its roof and electrodes, and an overhead crane positioned the buckets over the furnace and dumped the scrap in the furnace by opening the bottom of the buckets.

Due to the bulky volume of scrap, when the first charge was melted down, the furnace had to be opened again and a second charge added to the furnace. When this second charge was melted, then even a third opening and charging of the furnace was necessary.

This method had numerous drawbacks; specifically, substantial amounts of energy were lost at each opening due to radiation from the roof, electrodes and metal bath; and productivity of the furnace was severely restricted because of the maneuvering time needed for opening and charging the furnace for each bucket of scrap or prereduced materials.

In more recent years, a number of improvements have been made to the EAF steelmaking practice and consequently productivity has been considerably raised. These improvements include the use of Ultra High Power input to the furnaces which permits optimization of the overall melting operation of the furnace and leaves the refining and secondary metallurgical operations to be done in a separate ladle furnace.

Productivity of EAF's was further raised by continuous charging of scrap or prereduced materials. The iron-bearing material is introduced continuously into the furnace while the first charge is melting, thus obviating the crane maneuvering time.

Many methods for continuously charging EAF's have been proposed. These can be grouped under three general categories:

One method is to feed the EAF by dropping the iron particles through a hole in the roof of the EAF. An example of this method is described in U.S. Pat. No. 3,472,650 to J. G. Sibakin et al. Sibakin teaches a method of continuous charging of discrete iron-bearing material to an electric arc furnace, where the iron-bearing particles are dropped by means of suitable chutes through holes the roof of the furnace. One of the objects of this invention is to stabilize the electric arc by matching the rate of charge with the level of power fed to the furnace.

U.S. Pat. No. 2,805,930 to M. J. Udy is similar to Sibakin but its main object is to shield the furnace walls with the iron-bearing particles to be melted. For this purpose the iron-bearing particles are dropped from openings in the roof of the furnace close to the walls thereof.

This method of feeding EAF's has serious drawbacks. For example, the yield of molten iron produced from the charge is affected by the fact that the iron-bearing particles are entrained by the gases evolving in the furnace and are carried away. This loss of iron may amount up to about 1%. This entrainment has become even more significant due to the widespread use of pollution control equipment for treating the EAF's fumes, because all these gases are drawn into the treating equipment and consequently the gaseous currents inside the EAF are stronger. Also, it is difficult for the fine particles to penetrate the slag layer to reach the molten bath, which being light tend to float on the slag surface.

It has also been proposed to feed iron-bearing materials through the wall of the EAF principally for the purpose of charging the material into the proximity of the arcs, while avoiding the problems involved in feeding the material through the roof in the vicinity of the electrodes.

Examples of this type of feed for EAF's are disclosed in U.S. Pat. No. 3,462,538 to R. E. Pellegrini et al., U.S. Pat. No. 3,681,049 to J. Celada and U.S. Pat. No. 2,657,990 to C. R. Kuzell; as well as Canadian Patent No. 847,454 to G. A. Roeder et al.

Pellegrini describes a method and apparatus for the continuous charging of sponge iron granules into an EAF, wherein the sponge iron particles are injected by imparting to them sufficient energy so as to project them the furnace to the vicinity of the electrodes.

Celada discloses a similar system for injecting sponge iron particles into the furnace by means of a centrifugal slinger comprising a drive belt and a pulley. The sponge iron particles are injected into the vicinity of the arcs. Celada also describes in FIG. 4 another means to carry out his invention, namely a charging tube through which the particles are accelerated by a pressurized fluid, for example, gas, air or steam.

Kuzell describes a feeding system similar to that described by Celada.

Roeder also describes a feeding system where the iron-bearing particles are injected into the furnace by means of an air blast through an aperture in the furnace wall.

It has also been proposed to feed EAF's through the walls and close the surface of the liquid metal or slag usually covering the liquid metal. An example of such a method is described in U.S. Pat. No. 1,338,881 to G. J. Stock. Stock teaches feeding an electric furnace by means of a feed channel through which the iron charge is pushed into the furnace by a piston driven by a crank wheel. The crank wheel is rotated by an electric motor and the speed of the motor is regulated in order to balance the input of electrical energy and the amount of material to be melted with the general purpose of maintaining a constant temperature in the furnace.

A system similar to Stock's but related to calcium carbide production is described in U.S. Pat. No. 1,422,135 to W. B. Rogatz. Rogatz discloses a method of feeding materials into an electric furnace preferably horizontally through an opening in the wall of the furnace and above the molten material in the furnace by means of a piston which injects the material forcefully into the furnace to spread the material broadly across the surface of the molten material. The piston is made of carbon and operates similarly to the device shown by Stock.

U.S. Pat. No. 4,225,745 to Harwell also describes a method for charging small particles of iron and steel directly into molten metal in an arc furnace. Harwell teaches to charge iron oxides, such as mill scale, through a side-delivery tube directly into the bath. The bath is formed in the furnace by suitable charges of materials through the top of the furnace in a conventional manner.

The furnace has a feeder chute entering the furnace well below the normal full metal level. A feeding chamber is provided to introduce large masses of small particles of iron or steel into the feeder chute. A piston pushes the particles into the melting furnace. It will be appreciated that Harwell's charging system is very similar to Stock's, differing in the level of entry into the furnace.

Although at column 4, lines 22 to 29, Harwell mentions that a screw feed is possible, he teaches away from such use because of possible freezup and further teaches away from using even his own feeding system with carbon-containing pellets (because of the high temperatures that may develop in the feeder). On the contrary, the present invention is well suited to feed pellets with any carbon content because such pellets are not fed directly into the bath of molten metal but above the bath.

The problem of freeze-ups mentioned by Harwell makes a direct feed screw not suitable because molten metal may solidify in the feeding chute. While in the present invention applicants have uniquely provided that only slag may contact the feeder tip. Since they realized that solid slag is not as strong as iron or steel, therefore a direct feed screw type conveyor can be used in a manner that provides many advantages and makes the instant invention quite useful.

The other category of feeding systems comprises those actually using a screw type feeder. Examples of these are shown in U.S. Pat. No.: 1,421,185 to R. A. Driscoll; U.S. Pat. Nos. 1,871,848 and 1,902,638 both to E. G. T. Gustafsson.

Driscoll shows a screw type feeder in an electric furnace located above the molten metal bath to feed a powdered fuel. The iron-bearing material however is separately dropped from the top of the roof of the furnace. No details are shown of the cooperation of the fuel feeder and the furnace but from the drawing it can be inferred that the furnace is fixed and that the feeder is fixedly attached to the furnace wall.

Gustafsson discloses a method of melting metals in electric furnaces wherein the metallic material is supplied to the furnace continuously during the course of the heat. Gustafsson also teaches feeding sponge iron into the furnace, and he recognizes the problem of sponge iron floating in the slag layer. The measure he proposes to overcome this problem however is to increase the density of the material and not to apply a positive force to the material in the direction of the molten bath by means of the feeder.

It will be appreciated that although Gustafsson discloses the use of screw type feeders, these are not directed into the molten bath and are not adapted to apply any downward force to the material to supplement the force of gravity. Operation of Gustafsson's feeders is equivalent to dropping it from above. These screws only allow the material to flow out of the hoppers but do not positively push it in a determined direction either directly into the molten bath and/or through the slag layer.

A screw type feeder is also shown in U.S. Pat. No. 4,872,907 to L. D. Areaux who teaches a method and apparatus for charging metal chips into a molten bath, comprising a compacting extruder and a delivery conduit which is resistant to the mass of molten metal and which dips into the molten metal bath. Although Areaux's feeding system is described generally as applied to any metal, he particularizes at column 13, lines 23 to 30, that the invention is to be used in connection with nonmagnetic metal scrap, such as brass, aluminum, aluminum alloys and the like. It will be appreciated that it would be difficult to construct a feeder of this type to be immersed into molten steel. That is why Areaux applies his system to the above-mentioned metals excluding iron and steel.

It will be appreciated that the prior art fails to disclose a feeding system of DRI for a metallurgical furnace which provides the advantages of the invention herein described.

OBJECTS OF THE INVENTION

Accordingly, it is an object of the invention to provide a method and apparatus for feeding an EAF with iron-bearing materials, whereby the productivity of the EAF is increased.

It is another object of the invention to provide a method and apparatus whereby such iron-bearing materials are fed to the furnace close to the slag-layer covering the metallic bath in said furnace.

It is a further object of the invention to provide a method and apparatus whereby it is possible to convey such iron-bearing materials in a pneumatic transport system and to render economical the overall operation by making it possible to feed into EAF's all fines and broken particles formed in such pneumatic conveyor.

Other objects of the invention will be in part obvious and in part pointed out hereinafter.

BRIEF DESCRIPTION OF THE INVENTION

The objects and advantages of the invention are in general achieved by providing a method and apparatus for feeding iron-bearing particles into an electric arc furnace, comprising a molten iron holding vessel, having a wall extending above the molten iron, preferably a screw type feeder mounted on the exterior of the vessel, a feeding port in the wall shaped to permit passage of the feeder into the interior of the vessel and located at such a height from the molten iron that no molten materials may come out from the furnace through the port during the normal operation and maneuvering of the furnace; and actuating means for extending the screw type feeder from a retracted position out of the vessel to an advantageously adjustable extended position into the vessel whereby the iron-bearing particles are charged at a point proximate to but slightly above the molten iron, with such particles being positively pushed through the slag layer to the molten iron, and preferably forming a heap of material pushing somewhat above the slag layer, and also being pushed towards the arcs at the hottest zone of the furnace to shield and protect the tip of the feeder from excessive heat. Advantageously, at least a portion of the tip of the feeder extends into the slag layer to feed closely adjacent the upper surface of the metal bath.

The present invention is particularly useful with the novel pneumatic transport system described in our co-worker's U.S. application Ser. No. 07/526189, filed May 18, 1990; which is incorporated herein by reference.

DESCRIPTION OF THE DRAWINGS

In this specification and in the accompanying drawings, we have shown and described preferred embodiments of our invention and have suggested various alternatives and modifications thereof; but it is to be understood that these are not intended to be exhaustive and that many other changes and modifications can be made within the scope of the invention. The suggestions herein are selected and included for purposes of illustration in order that others skilled in the art will more fully understand the invention and the principles thereof and will thus be enabled to modify it in a variety of forms, each as may be best suited to the conditions of a particular use.

DETAILED DESCRIPTION OF A PREFERRED EMBODIMENT

Figure 1:
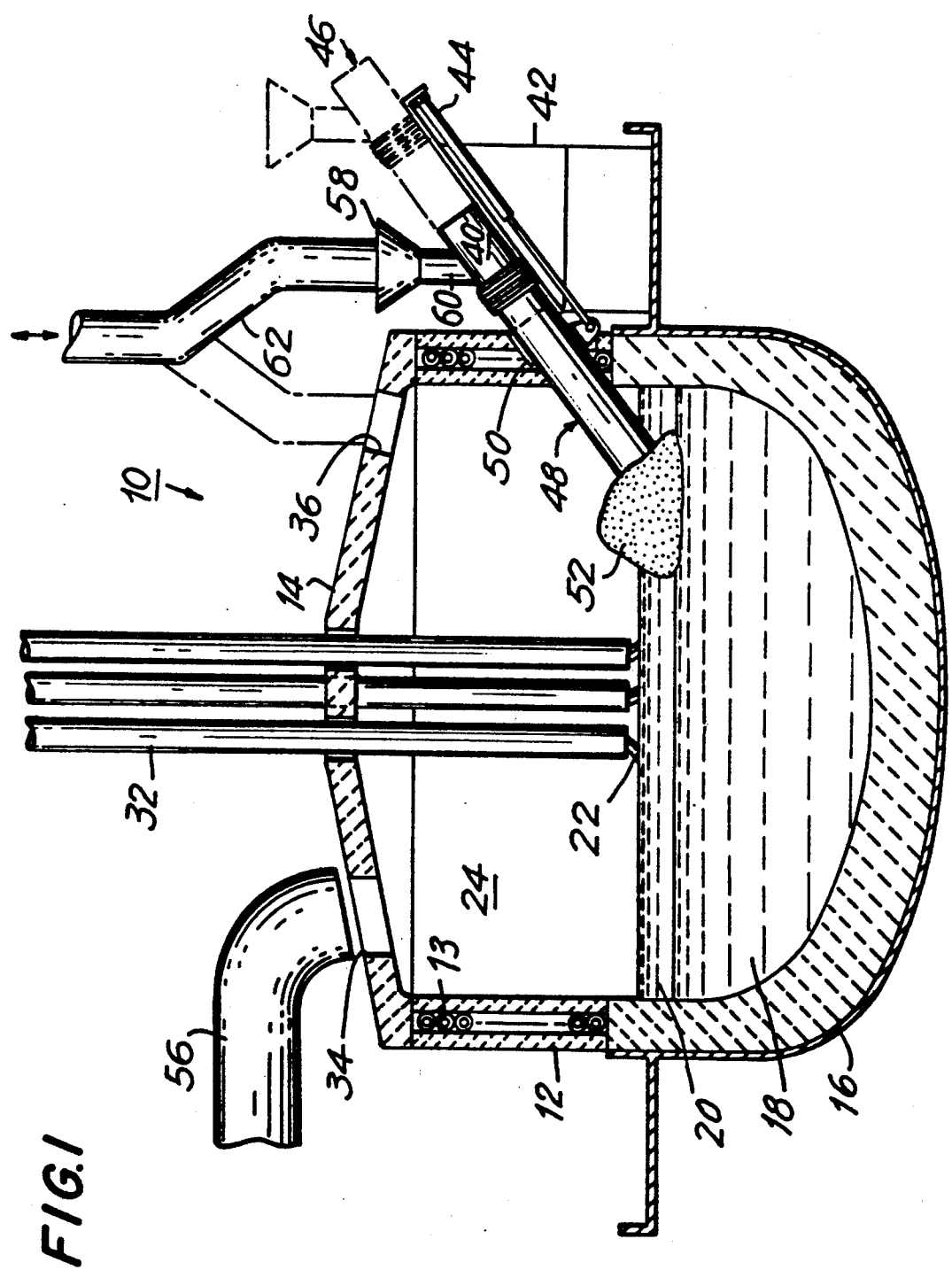
FIG. 1 shows a partially schematic diagram of the general arrangement of an electric arc furnace shown in vertical cross-section, and incorporating a preferred embodiment of the present invention in the form of a screw type feeder for DRI.

Referring to FIG. 1, numeral 10 generally designates an electric arc furnace having a wall section 12, a roof 14, and a crucible portion 16 which at its bottom is adapted to hold a molten iron bath 18 usually covered by a slag layer 20. The wall 12 forms an inner volume 24 for enclosing the charge materials while being melted and also to contain the radiation of the arcs 22 and the gases evolving in the melting and refining process. Normally this wall portion is formed by refractory-clad water cooled panels 13 to save on the refractory materials which were formerly used without cooling.

Roof 14 has openings for the free movement and control of electrodes 32, typically three triangularly-arrayed electrodes in furnaces operating with alternating current supply and only one electrode in the direct current furnaces. Other openings 34 and 36 permit extraction of fumes and continuous feeding of iron-bearing materials through the roof.

A screw type feeder 40 is mounted on the exterior of furnace 10 and supported by a structure 42. Actuating means such as a hydraulic cylinder 44 or the like permits the movement of feeder 40 on structure 42 from a retracted position 46 symbolized by dotted lines outside of the furnace, to an operating position 48. This retractable characteristic of feeder 40 is very useful in the EAF operating environment, because it allows the free movement and maneuvering of the furnace, for deslagging and pouring of steel, without danger of damaging the feeder 40. Slag may impinge upon the tip of the feeder without problem, because solid slag is not very strong and can be broken by the normal force of the feeder. However any contact with molten iron should be avoided, and that is why the operating position of feeder 40 must be selectively controlled.

The feeder 40 is introduced into the furnace through an opening 50 in the wall 12 at an angle in the range of 10 and 45 degrees with respect to the horizontal, in order to provide a positive a pushing force upon the iron-bearing material in the direction of and down into the molten bath. Introduction of feeder 40 at an angle with respect to the horizontal also contributes to the important feature of this invention namely to feed the iron-bearing material very close to the molten iron bath, while at the same time preventing molten iron from spilling out of the furnace during EAF maneuvering. Being able to place the iron-bearing material to extend down into the slag layer substantially reduces the loss of fine particles in the gases coming out of the furnace and raises its productivity. This feature becomes more important when handling friable materials, for example DRI, also called sponge iron, which is usually transported to the meltshop by mean of belt conveyors, by crane-operated buckets that are filled by gravity, or more recently even by pneumatic systems. Thus, the original processing and such subsequent handling of the DRI cause some of the particles to break up and partially crumble, thereby generating fines.

A heap 52 of the iron-bearing material is usually formed with the DRI pushing into the slag layer and simultaneously piling up above the slag layer 20, thus protecting the tip of feeder 40 from overheating by radiation from the arcs 22. Maintaining this heap 52 also contributes to preventing fine particles of the iron-bearing material from being entrained by gases and fumes exiting the furnace through opening 34 and collecting duct 56.

Iron-bearing material, such as DRI, is transferred by suitable duct 62 to funnel or bin 58 and on into feeder 40 via chute 60, which chute 60 and it funnel or bin 58 can be coupled and uncoupled from duct 62 to permit feeder 40 to be retracted outside the EAF to the discharge nonoperating position 46. During periods of maintenance or repair of the feeder 40, the duct 62 can be repositioned to supply opening 36 as a temporary alternative means of continuous feed to the EAF.

Figure 2:
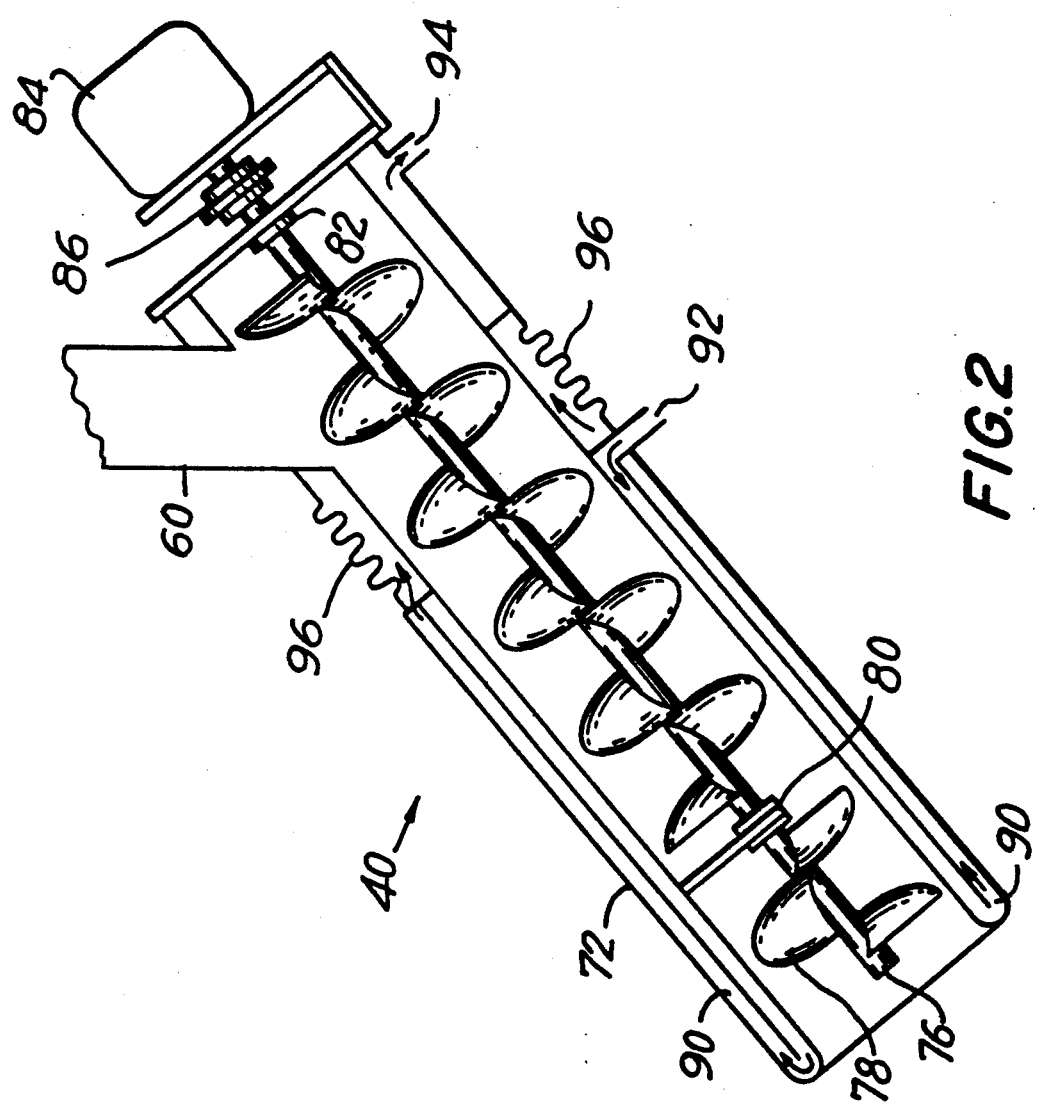
FIG. 2 shows a more detailed schematic diagram of the screw feeder also rendered in vertical cross-section showing its main characteristics and the cooperation of its parts in order to achieve the objects of the invention.

Turning now to FIG. 2, which shows a diagram of the construction of the screw-type feeder, numeral 40 generally designates the feeder comprising a downwardly-angled cylindrically shaped housing 72, communicating with a feeding pipe 60 close to its upper end. A shaft 76 is rotatably mounted inside the housing 72. The shaft having a screw type helical blade 78 which pushes the granular materials received from chute 60 through the feeder 40 to the lower discharge end thereof and is supported by bearings 80 and 82. Bearing 80 is located inside the housing at a sufficient distance from the lower end facing the inside of the EAF in order to protect it from the heat of the furnace. The lower tip of the housing 72 and of the shaft 76 and of the screw blade 78 can advantageously all be made from a more heat resistant metal then the remainder of the feeder 40. The lower bearing 80 might be omitted in certain applications.

Shaft 76 is driven by driving means 84, such as a high torque hydraulic motor and a suitable speed reducer, engaging the shaft through coupling device 86 in a manner known in the art.

The housing 72 is cooled by circulation of a fluid, water for example, which flows through passage 90 from an inlet 92 remote from the lower tip, down just under the interior surface of the housing 72, to the lower tip, back up just under the outer surface of the housing 72, and exits through outlet 94. An expansion joint 96 is provided in order to allow for expansions of housing 72 due to temperature increase during operation, caused by radiation from the furnace and also from the iron-bearing material when charged at high temperatures (on the order of 450° C. to 950° C.).

From the foregoing description it will be evident that a feeder for metallurgical furnaces incorporating the present invention is capable of providing the several advantages outlined above. The construction of the feeder renders it possible to guide the iron-bearing material through a duct right to a point very proximate to the molten iron bath without loss of iron units, thereby increasing the overall productivity of the furnace. The positive thrust which the screw-type feeder applies to the material pushes it in the direction of the molten bath so that the particles penetrate the slag layer and also in the direction of the arcs of the furnace which is the hottest zone therein making its operation more efficient and controllable. Also the fines and small particles tend to concentrate in the lower part of the feeder and are protected from the gaseous currents inside the furnace by the larger particles, thus contributing to increase the overall yield of the furnace. The retractability of the feeder permits positioning it very close to the upper surface of the iron bath, even though the level of the surface may vary during the operation of the furnace, and also serves to protect it from contacting the molten iron when maneuvering the furnace for deslagging or pouring of molten iron.

In the broader aspects of this invention, in place of the screw feed 40, a push rod such as in U.S. Pat. No. 1,422,135 can be used; however, modified to push particles down into the slag layer with a force which is in addition to gravity.

It is of course to be understood that the embodiments of the invention herein described are intended to be illustrative and it will be evident to those skilled in the art that numerous changes can be made in these illustrative embodiments without departing from the scope of the invention.

What is claimed is:

1. A method of feeding iron-bearing particulate materials by means of an elongated feeder having a lower delivery end into a metallurgical furnace for containing a bath of molten iron with a layer of slag covering said molten iron and having at least one upper side wall above said slag for containing emissions from the bath including gases and radiant heat, comprising the steps of forming the bath of molten iron with an upper slag layer in said furnace, introducing the lower delivery end of the elongated feeder through a hole in one of the upper side walls of said furnace to an operative position at least closely adjacent said slag layer and not extending into the molten iron, pushing a charge of said iron-bearing particulate materials down into said slag layer by means of said feeder towards said bath of molten iron, and continuously regulating the charging of the iron-bearing particulate materials through said feeder into the slag layer at a rate effectively equal to that at which the particulate materials charged to the furnace are melted in the furnace.

2. A method according to claim 1, wherein said furnace is an electric arc furnace, said iron-bearing particulate materials are sponge-iron, and further comprising water cooling said lower end of the feeder and additionally forming and maintaining a heap of the iron-bearing particulate materials in front of the feeder in order to protect at least partially said feeder from the heat radiated by the bath of molten iron and by arcs in the furnace.

3. A method according to claim 2, wherein said feeder is a screw feeder and is adjustably positioned within said furnace relative to varying levels of the bath of molten iron to keep the delivery end of the feeder always above the bath of molten iron and during feeding at least closely adjacent the slag layer.

4. A method according to claim 3, wherein during feeding of the iron-bearing particulate materials towards the bath of molten iron, the delivery end of the feeder is kept at least partially immersed in the slag layer.

5. Apparatus in the form of a feeder for charging iron-bearing particulate materials into a metallurgical furnace adapted to contain a bath of molten iron and a layer of slag covering said bath, comprising a housing of a generally cylindrical shape, a shaft rotatably mounted inside said housing and having screw-type helical blade extending from an upper feed end to a lower discharge end to push said particulate materials through said feeder and out of the lower discharge end, driving means to cause said shaft to rotate in said feeder, and actuating means to position the discharge end of said feeder over a range of depths and not extending into the molten iron and yet being effectively close to said bath of molten iron to be capable of pushing said materials through said slag layer to said bath and to retract said feeder from an operative position inside the furnace to a non-operative position outside the furnace whereby when in the non-operative position, said feeder does not interfere with required repositioning of said furnace, and said shaft being at an angle to a horizontal effective to push the particulate materials positively into said slag layer.

6. Apparatus according to claim 5, wherein said shaft is angled at least 10° to the horizontal.

7. Apparatus according to claim 5, wherein said shaft is angled between 30° and 45° to the horizontal.

8. Apparatus according to claim 6, wherein the lower discharge end of said housing has a water-cooled jacket.

* * * * *